(12) United States Patent
Olsen-Kreusch

(10) Patent No.: US 9,411,950 B1
(45) Date of Patent: Aug. 9, 2016

(54) METHODS AND SYSTEMS FOR USER AUTHENTICATION IN A COMPUTER SYSTEM USING IMAGE-BASED LOG-INS

(71) Applicant: Susan Olsen-Kreusch, Norwood, MA (US)

(72) Inventor: Susan Olsen-Kreusch, Norwood, MA (US)

( * ) Notice: Subject to any disclaimer, the term of this patent is extended or adjusted under 35 U.S.C. 154(b) by 94 days.

(21) Appl. No.: 14/306,226

(22) Filed: Jun. 17, 2014

(51) Int. Cl.
*G06F 21/45* (2013.01)
*G06F 21/36* (2013.01)
*H04L 9/32* (2006.01)
*H04L 9/00* (2006.01)

(52) U.S. Cl.
CPC .............. *G06F 21/36* (2013.01); *G06F 21/45* (2013.01); *H04L 9/00* (2013.01); *H04L 9/32* (2013.01)

(58) Field of Classification Search
USPC .......... 726/4, 5, 6, 7; 713/168, 169, 170, 182, 713/183, 184, 185
See application file for complete search history.

(56) References Cited

U.S. PATENT DOCUMENTS

| | | | |
|---|---|---|---|
| 5,928,364 | A | 7/1999 | Yamamoto |
| 7,644,433 | B2 | 1/2010 | Mizrah |
| 7,734,930 | B2 | 6/2010 | Kirovski et al. |
| 8,090,201 | B2 | 1/2012 | de Leon |
| 2004/0230843 | A1* | 11/2004 | Jansen ............ G06F 21/36 726/7 |
| 2009/0083850 | A1 | 3/2009 | Fadell et al. |
| 2010/0306841 | A1* | 12/2010 | Wang ............ G06F 21/36 726/19 |
| 2012/0023574 | A1* | 1/2012 | Osborn ............ G06F 21/36 726/19 |
| 2012/0036573 | A1 | 2/2012 | Yang |
| 2012/0159616 | A1 | 6/2012 | Griffin et al. |

FOREIGN PATENT DOCUMENTS

CN 102081488 6/2011

OTHER PUBLICATIONS

Suo, X., Zhu, Y & Owens, G.S.; Graphical passwords: A survey; Proceedings of the 21st Annual Computer Security Applications Conference 2005 (ACSAC 2005); 2005; 10 pages; 1063-9527/05; IEEE Computer Society.
Lin, P.L., Tung, W.L & Huang, P.W.; Graphical passwords using images with random tracks of geometric shapes; Congress on Image and Signal Processing 2008 (CISP '08); 2008; pp. 27-31, 978-0-7695-3119-9/08; IEEE Computer Society.

* cited by examiner

*Primary Examiner* — Brandon Hoffman
*Assistant Examiner* — Samuel Ambaye
(74) *Attorney, Agent, or Firm* — Maura K. Moran

(57) ABSTRACT

Systems and methods are disclosed for computer-based user authentication to prove user identity or to approve access to a resource such as a computer system, in which a user performs a set of actions on at least one verification image on a display screen. Users are authenticated by a computer comparing the set of actions against a key definition for the verification image. The set of actions may include selecting at least one target location on the image, selecting target locations in a selected order, selecting the target locations with a selected pattern, selecting at least one overlay with which to cover a one target location, superimposing a target location with a selected overlay, covering the target locations with overlays in a selected superimposing order; and covering the target locations with overlays in a selected superimposing pattern.

24 Claims, 14 Drawing Sheets

Verification Image/Key combination: 730a

Image: Skier 710 ← 731

Key Definition 759:

| Target locations 733 | Items 734 |
|---|---|
| 711 | left hand |
| 712 | rt. pole basket |
| 713 | left boot |

739

Verification Image/Key combination: 830b

Image: Garden 810 ← 831

Key Definition 859:

| Target locations 833 | Items 834 | Overlay 837 |
|---|---|---|
| 811 | mom's rt. arm | happy 851, happy 857 |
| 812 | mom's. hat | happy 852, happy 853 |
| 813 | seedling | happy 856 |
| 814 | girl's hat | neutral 854, sad 855 |

FIG. 9

900: Conducting Computer-Based User Authentication

910: Receive, using processor 190 and communication module 340, a request from a user to access an application on a computer system.

920: Access user information pertaining to the user with a verification module 360.

930: With presentation module 350, select a verification image from the verification image/key definition combinations, and present the selected verification image to a user interface for review by the user.

940: The user inputs the key associated with the selected verification image with the user interface.

950: The user interface uses the key verification module 360 to submit the inputted key by communicating via the communication module 340.

960: With key verification module 360, verify the inputted key by comparing the inputted key with the key definition associated with the selected verification image.

970: With access module 370, generate an authorization that allows the user to access the application; and provide the user access to the application.

METHODS AND SYSTEMS FOR USER AUTHENTICATION IN A COMPUTER SYSTEM USING IMAGE-BASED LOG-INS

CROSS-REFERENCE TO RELATED APPLICATION none

FIELD

This application relates generally to authenticating a user of a computer system to prove user identity or to approve access to a resource such as a computer system.

BACKGROUND

Computer applications traditionally require a user to login by providing information to verify the user's identity (typically account name and password). Such passwords are usually a series of letters, numbers, and symbols. Because often such logins are in public spaces, such as at Automated Teller Machines (ATMs), a user runs the risk of being watched during the login process and having his password discovered. For example, a thief could surreptitiously watch the login transaction and thus capture the user name and password. In addition, if the user logon attempt is performed over the Internet, the user name and password could be collected using malicious software, also known as malware. However the sensitive information is collected, the thief could then himself login to the user's account using the misappropriated username and password, and conduct business posing as the user.

The cost to affected users and businesses of computer-based fraud is enormous. Many users find themselves responsible for paying for purchases that they did not make. Their banks and credit card companies often assume the responsibility for the debt. In response to the security threat provided by such fraud, many banks and businesses, especially those that sell mainly over the Internet, provide fraud insurance or guarantees to users. In addition, they invest in extensive computer security measures designed to protect against computer-based fraud.

Certain solutions have been suggested to make logins more secure. For example, some systems require multiple passwords from users before they can obtain access to a computer. Users are sometimes presented with challenge questions, to which they need to remember details from their past or answers that may change over time (What was your high school/first pet/first date? What is your favorite food/drink/book/movie? Who is your best friend?) Users are advised to avoid using the same password over and over. If a user must maintain and/or remember multiple complicated passwords for disparate applications, from a usability perspective, access to computer applications becomes considerably less convenient whether the desired applications are accessed through disparate locations, such as locally, on a local network, or over the Internet. In addition, many passwords are text based which make them vulnerable to misappropriation by thieves.

Therefore, it is desirable to have a login system for computer applications that is simple, easy for the user to remember, difficult for the hacker to misappropriate, and takes into account the modern reality of our access to multiple computer applications through disparate locations, whether locally, on a local network, or over the Internet.

SUMMARY

An improvement is disclosed in computer-based user authentication, in which a user performs a set of actions on at least one verification image on a display screen. User authentication in the form of comparing the set of actions against a key definition for the verification image may be provided to prove user identity or to approve access to a resource such as a computer system.

Methods and systems for computer-based user authentication, in which a user performs a set of actions on at least one verification image on a display screen, are herein disclosed. In one embodiment, using a processor and a communication module, a request is received from a user to access an application on a computer system. In response to receiving the request to access an application, a verification module accesses information pertaining to the user. The user information, including a plurality of verification image/key definition combinations, may be accessed from a user information module on a server. The key associated with a verification image may be a set of actions to be performed on the selected verification image, and the key definition may be an identification of the set of actions that make up the key.

With a presentation module, a verification image is selected from the plurality of verification image and key definition combinations and presented to a user interface for review by the user. When the user inputs the key associated with the presented verification image with the user interface, the user interface submits the inputted key by communicating via the communication module with the verification module. The inputted key is verified with a key verification module by comparing the inputted key with the key definition associated with the presented verification image. In response to the presentation module verifying the inputted key, an access module generates an authorization that allows the user to access the application; and the user is provided access to the application.

In one embodiment, the key associated with the selected verification image is unique. In other embodiments, keys for different verification images could be identical or similar.

The set of actions to be performed on the selected verification image may have at least one of the following key components: selecting at least one target location on a selected verification image and selecting target locations in a predetermined selection order to form a series of actions. In addition, in the series of actions, the target locations may be selected with a predetermined selection pattern, in which a target location may be selected only once multiple times, either sequentially or again after another target location is selected during the series of actions.

In further embodiments, the set of actions to be performed on the selected verification image may have at least one of the following key components: selecting at least one overlay with which to cover at least one of the target locations, superimposing a target location with a selected overlay; covering the target locations with one or more overlays in a predetermined superimposing order; and covering the target locations with the overlays in a predetermined superimposing pattern.

In further embodiments, selecting at least one target location on a selected verification image may have at least one of the following actions: tapping on the at least one target location; touching the at least one target location; or selecting the at least one target location with a computer input device such as mouse or a trackball.

In still further embodiments, certain actions or components of the actions may be unique to the presented verification image. For example, a location associated with the selected verification image may be unique, the predetermined selection order for selecting the target locations in the selected verification image may be unique, and the predetermined selection pattern for selecting the target locations in the selected verification image may be unique.

Further, the selected overlay for superimposing over the target location may be unique. The predetermined superimposing order for covering the target locations with the at least one overlays may be unique, and the predetermined superimposing pattern for covering the target locations with overlays may be unique. In addition, in the predetermined superimposing pattern, a target location may be covered only once, or at least one of the target locations may be covered multiple times with the same or a different overlay, either sequentially or again after another target location is covered during the series of actions.

In certain embodiments, the key associated with the selected verification image is established by the user and a method for establishing image-based passwords for computer-based user authentication is provided. In one embodiment, using a processor and the communication module, a request is received from a user to set up an image-based password for a challenge verification image for user authentication on the computer system. In response to receiving the request, a set-up module accesses information pertaining to the user and prepares to receive the user's selection of a challenge verification image.

The user may select the challenge verification image with the user interface, which may be the same user interface as is used in the verification process or may be a separate set-up user interface. The user may select the challenge verification image from among verification image candidates presented to the user interface with the presentation module and the communications module, or the communications module may allow the user to submit the challenge verification image through the user interface. Alternatively, the user may choose one of her previous verification images in order to change the key definition associated with the previous verification image.

When the challenge verification image is accepted, the method may provide an action capture module and the communications module to allow the user to create a challenge key to be associated with the challenge verification image and to submit the challenge key definition for the challenge key through the user interface. In response to receipt of the key definition, the challenge key definition may be associated with the challenge verification image using the set-up module to form a new verification image/key definition combination. Information related to the new verification image/key definition combination may be stored with the user information on the server by the set-up module and the user information module on the server.

In certain embodiments, a system for computer-based user authentication, in which a user performs a set of actions on at least one verification image on a display screen, may comprise a processor and a non-transitory computer-readable medium encoding instructions for computer-based user authentication and for execution by the processor. The instructions may include one or more modules for executing the methods described above.

In certain embodiments, a system for establishing image-based passwords for computer-based user authentication, in which the user performs a set of actions on at least one verification image on a display screen, may comprise a processor and a non-transitory computer-readable medium encoding instructions for computer-based user authentication and for execution by the processor. The instructions may include one or more modules for executing the methods described above.

In other embodiments, a computer program for computer-based user authentication, in which a user performs a set of actions on at least one verification image on a display screen, may be embodied on a non-transitory computer readable medium. The computer program may comprise modules encoding interrelated and interdependent processes, including one or more modules, and the computer program may be configured to perform the methods described above.

In other embodiments, a computer program for establishing image-based passwords for computer-based user authentication, in which a user performs a set of actions on at least one verification image on a display screen, may be embodied on a non-transitory computer readable medium. The computer program may comprise modules encoding interrelated and interdependent processes, including one or more modules, and the computer program may be configured to perform the methods described above.

The improvements to computer-based user authentication here disclosed creates a system that revolves around the image-based authentication. By using the image-based authentication as disclosed, a more discreet and secure logins may be possible.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 8b is a diagrammatic representation of the display screen of FIG. 8a, with an exemplary image-based, overlay-based, and multi-selection patterned key applied to the verification image of FIG. 8a; and FIG. 9 is a block diagram of an embodiment of the user verification application of FIG. 2.

DETAILED DESCRIPTION

Figure 1:
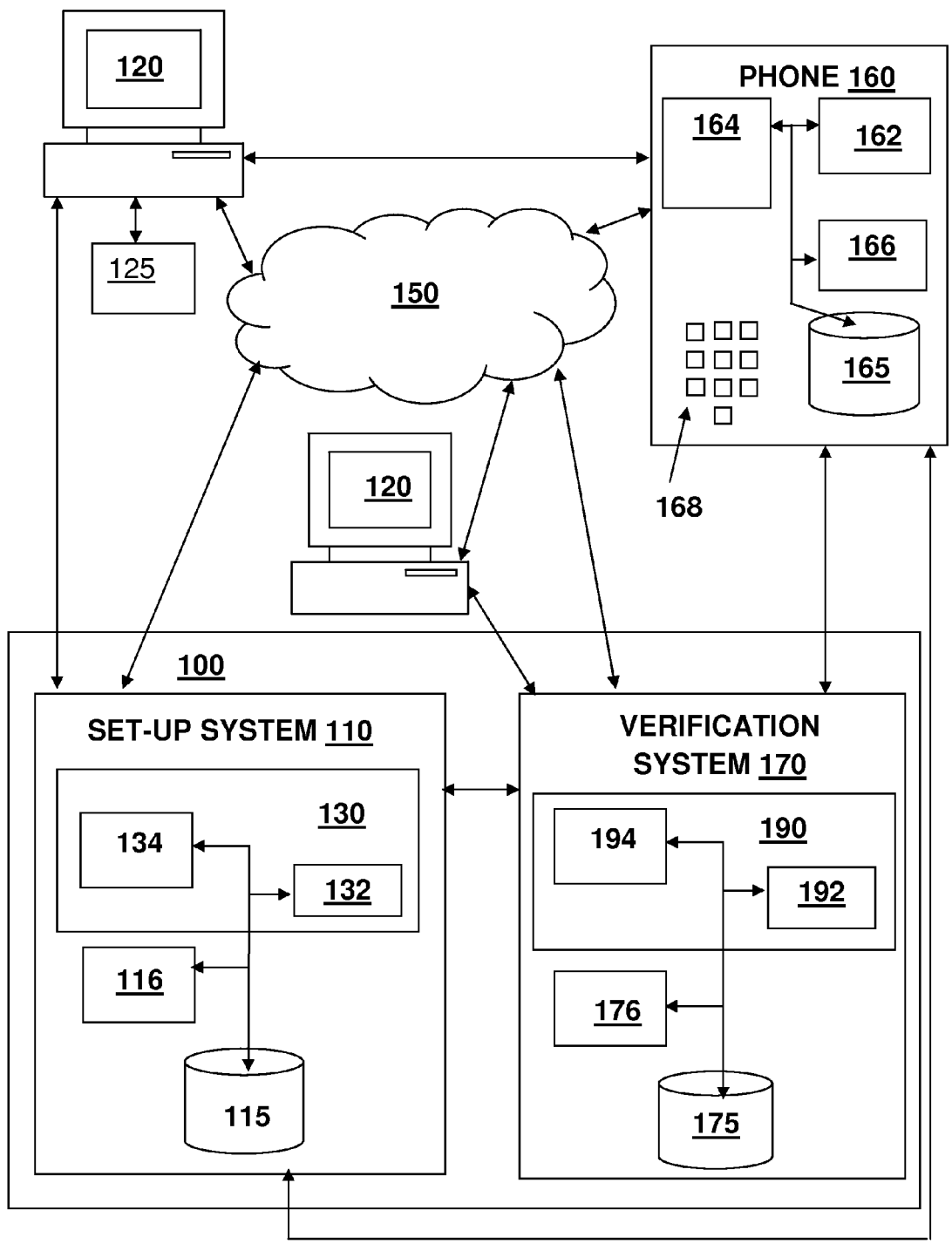
FIG. 1 is a block diagram of an exemplary computer-based user authentication system.

Reference will now be made in detail to the present exemplary embodiments, examples of which are illustrated in the accompanying drawings. Wherever possible, the same reference numbers will be used throughout the drawings to refer to the same or like parts.

An image-based authentication system 100 according to the present invention will now be described in detail with reference to FIGS. 1 to 3 of the accompanying drawings. The authentication system 100 is an image-based sign-in system providing user authentication based on the user performing a set of actions on at least one verification image on a display screen. The user authentication may be for the purposes of proving user identity or approving access to a resource such as a computer system. The authentication system 100 has a set-up system 110 for that allows a user to select multiple verification images and to establish a key to be associated with each of the verification images. For further security, the user may design a unique key for each of the multiple verification images.

The authentication system 100 also has a verification system 170 for presenting one of the selected multiple verification images to a user, allowing the user to input a key associated with each of the verification images, and authenticating the user based on the success of the input of the key by the user. The set-up system 110 has at least one processor such as a server 130, which hosts an application 132 for providing an authentication set-up website 134 for establishing passwords for computer-based user authentication and, and a user information module 116 for use in accessing a storage unit 115. The application 132 may have computer implementable instructions encoded in a non-transitory computer-readable medium for execution by a processor such as the server 130. The storage unit 115 may be used for storing instructions such as in application 132 and data for operating the website 134 and populating the website with information about setting up image-based passwords, verification images with which to associated passwords, and components for the keys to be established.

The authentication system 100 also has a verification system 170 for presenting one of the multiple verification images to a user, allowing the user to supply the key associated with the verification image, and authenticating the user based on the success of the input of the key by the user. The verification system 170 has at least one processor such as a server 190, which hosts an application 192 for providing a verification website 134 for computer-based user authentication, and a user information module 176 for use in accessing a storage unit 175. The application 192 may have computer implementable instructions encoded in a non-transitory computer-readable medium for execution by a processor such as server 190. The storage unit 175 may be used for storing instructions such as in application 192 and data for operating the website 194 and populating the website with information about verifying authentication with verification images setting up image-based passwords.

Users of the system 100 may communicate with the servers 130, 190 and access the website 134, 194 using computer 120. Computer 120 may be a remote special-purpose computer at a location such as a bank or mall, or it may be their own computer such as a desktop computer, laptop computer, tablet, or any other conventional or known computing devices. Users of the system 100 may also communicate with the servers 130, 190 and access the websites 134, 194 using a telephone such as a mobile telephone 160 that may communicate with their own computers 120 or to the server 130, 190.

The user's telephone 160 may have a processor which hosts an application 162 for facilitating access to the authentication system 100, and for providing on-line access for the user. The telephone 160 may also have a display 167 for displaying information from the authentication system 100. The telephone may also have an integrated storage device 165 for storing instructions and data for operating the telephone 160, for managing interactions with the authentication system 100, and for managing the on-line connections. The telephone 160 may also have a user information module 166 for use in accessing the integrated storage device 165. The telephone 160 may also have a keypad 168 for use in telephoning, providing instructions to the telephone processor, and inputting other data, such as capturing actions for establishing keys, and for inputting keys to authenticate use of a computer or application.

Figure 2:
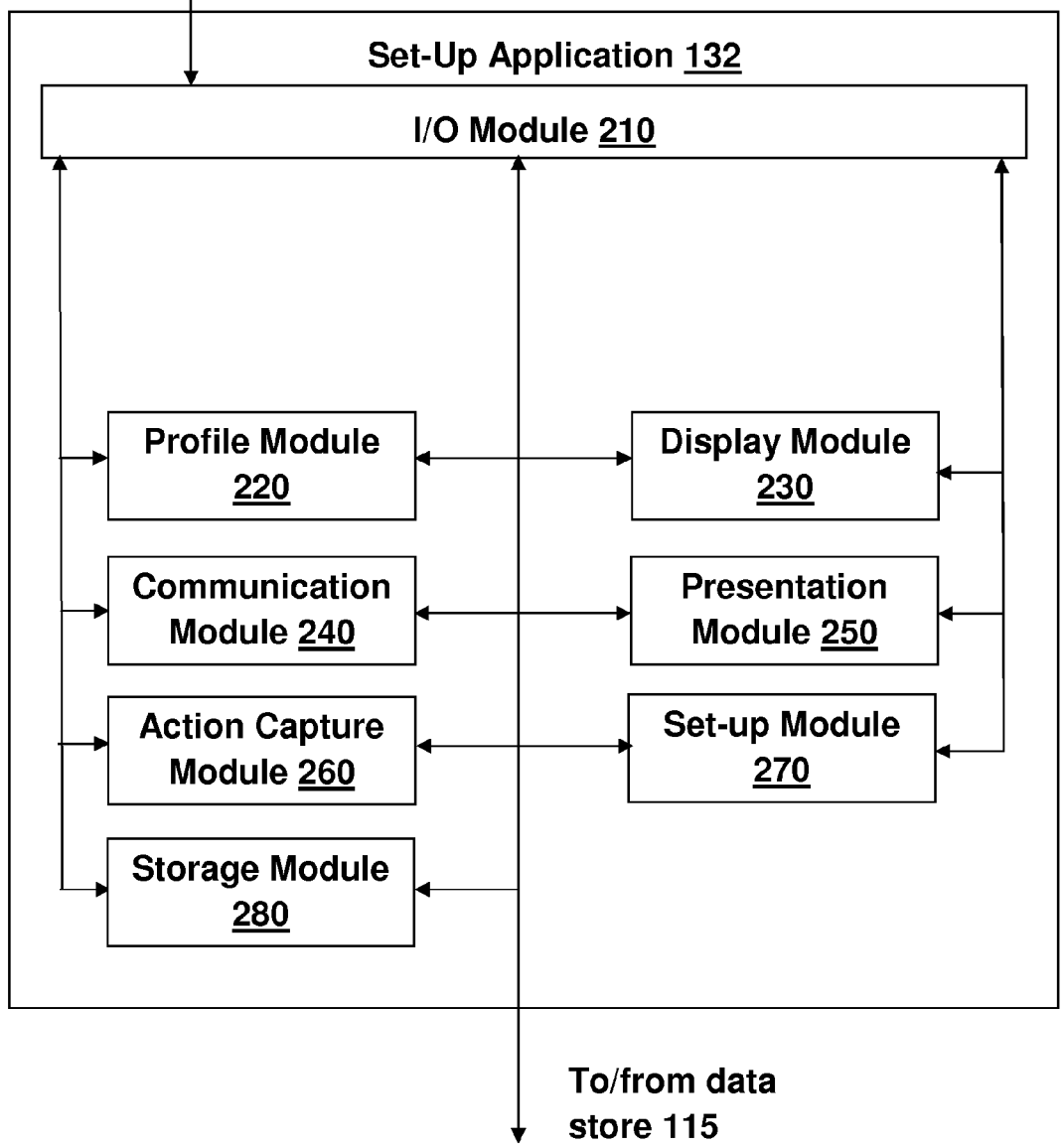
FIG. 2 is a block diagram of a set-up application for use in the computer-based user authentication system in FIG. 1.

As shown in FIG. 2, the application 132 may have an I/O module 210 to process communications to and from the server 130. The application 132 may have a profile module 220 for developing a website profile page that may be customized to the user, and a display module 230 for facilitating the display of the website pages.

The application 132 may also have modules for providing other features, functionality, and pages of the website 134, such as a communication module 240 for issuing and processing instructions from the user computer 120 or phone 160, a presentation module 250 for presenting verification image candidates to the user at computer 120, an action capture module 260 for capturing actions defined by the user as components of the challenge key to be associated with the challenge verification image, an association module 270 for associating the challenge key definition with the challenge verification image to form a new verification image/key definition combination, and a storage module 280 for storing information related to the new verification image/key definition combination with the user information on the server.

Figure 3:
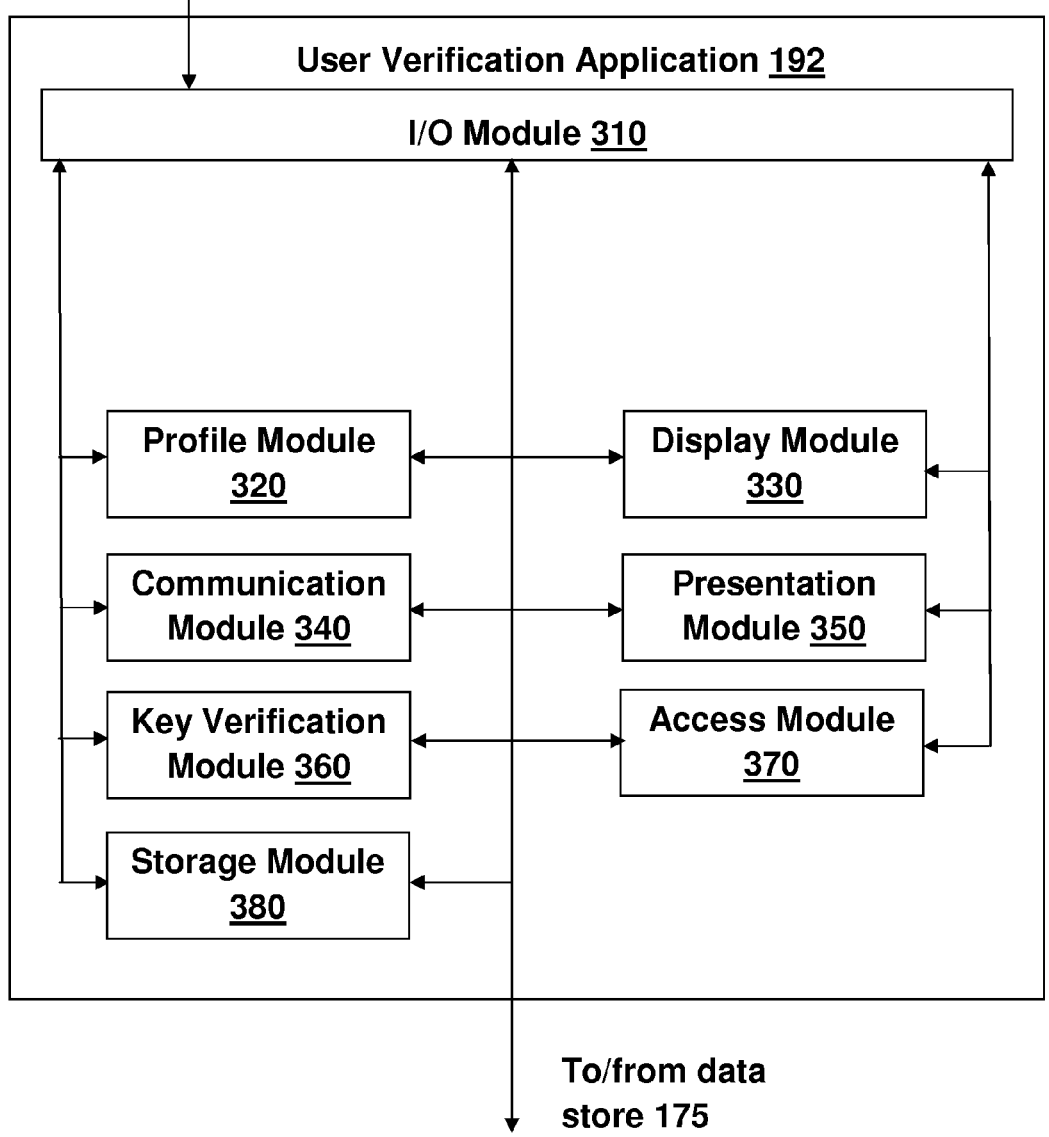
FIG. 3 is a block diagram of a user verification application for use in the computer-based user authentication system in FIG. 1.

As shown in FIG. 3, the application 192 may have an I/O module 310 to process communications to and from the server 190. The application 192 may have a profile module 320 for developing a website profile page that may be customized to the user, and a display module 330 for facilitating the display of the website pages.

The application 192 may also have modules for providing other features, functionality, and pages of the website 194, such as a communication module 340 for issuing and processing instructions from the user computer 120 or phone 160, a presentation module 350 for presenting verification image candidates to the user at computer 120, a verification module 360 for verifying keys inputted by users, an access module 370 for generating and issuing an authorization that allows the user to access the application, and a storage module 380 for storing information related to the new verification image/key definition combination with the user information on the server.

The components depicted in the Figures may be operatively connected to one another via a network, such as the Internet 150 or an intranet, or via any type of wired or wireless communication system. Connections may be implemented through a direct communication link, a local area network (LAN), a wide area network (WAN) and/or other suitable connections.

One skilled in the art will appreciate that although only one or two of the components identified above is depicted in the Figures, any number of any of these components may be provided. Furthermore, one of ordinary skill in the art will recognize that there may be more than one phone 160, or more that two computers 120, and that functions provided by one or more components of any of the disclosed systems may be combined or incorporated into another component shown in the Figures.

One or more of the components depicted in FIG. 1 may be implemented in software on one or more computing systems. For example, they may comprise one or more applications, which may comprise one or more computer-readable instructions which, when executed by a processor, cause a computer to perform steps of a method, or they may be combined to provide multiple functionalities. Further, while the modules are shown in the figures as associated with a specific processor, such as servers 130, 190 or telephone 160, or system, such as systems 130, 170, it is to be understood that the module may operate on any other processor shown or not shown or it may be a standalone program.

Further, the instructions for the module may be stored on the storage device associated with the specific processor or any other storage device, or they may be stored on one or more storage devices, and transferred to run on the shown processor or other or multiple processors. Computer-readable instructions may be stored on a computer-readable medium, such as a memory or disk. Such media typically provide non-transitory storage. Alternatively, one or more of the components depicted in FIG. 1 may be hardware components or combinations of hardware and software such as, for example, special purpose computers or general purpose computers. A computer or computer system may also comprise an internal or external database. The components of a computer or computer system may connect through a local bus interface.

The databases and storage units shown in FIG. 1 may be implemented as separate databases and repositories as shown in FIG. 1 or as one or more internal databases stored, for example, on the server 110. Storage units 115, 175 may be accessed by other components in system 100 directly via an external connection or via a network (not shown). Further, the user interfaces employed by the set-up system and the verification system, as shown in FIG. 1, may be integrated into the systems 120, 160, or they may be separate units.

Figure 4:
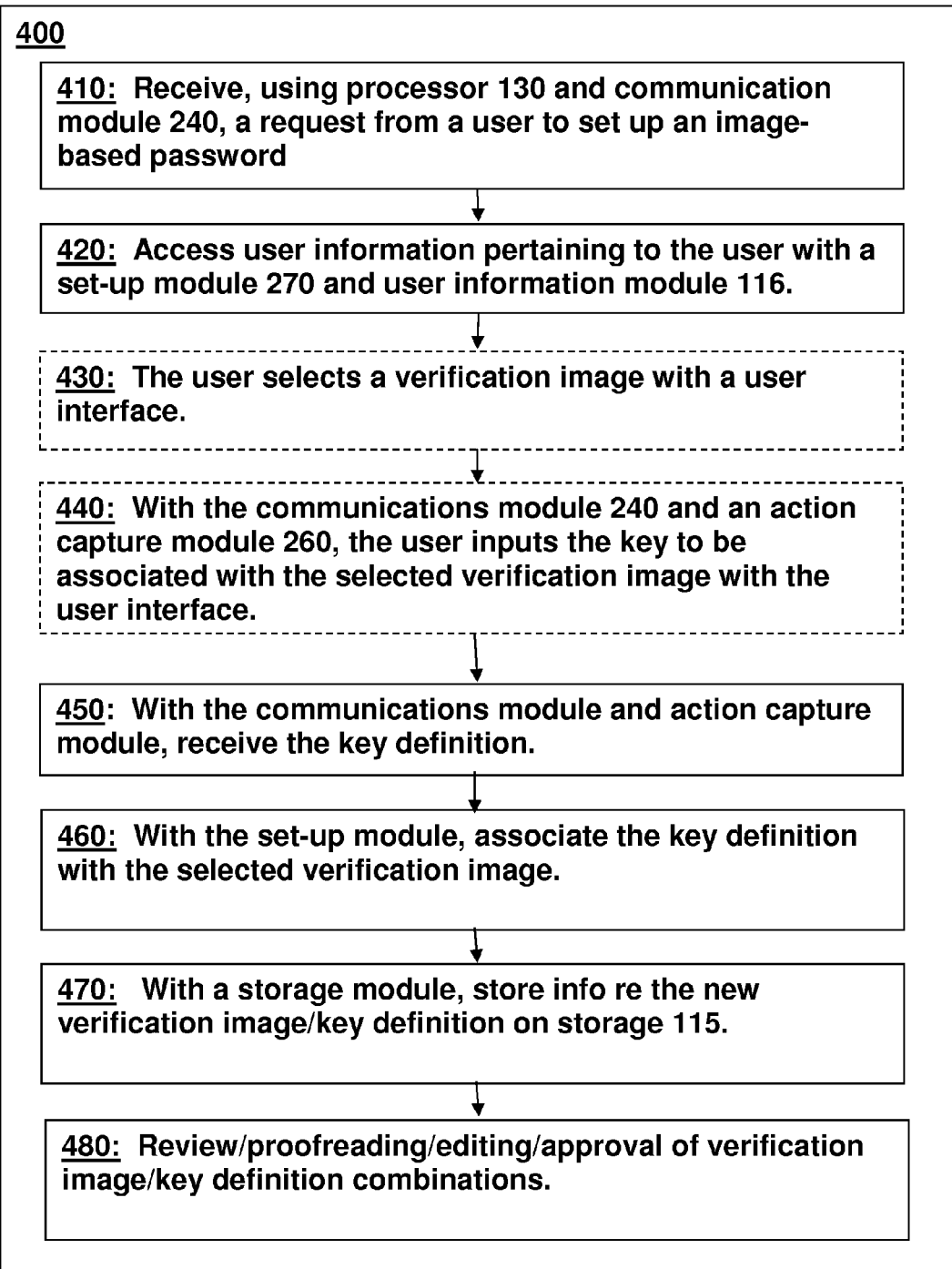
FIG. 4 is a block diagram of an embodiment of the log-in image set-up application of FIG. 3.

In certain embodiments, the image-based passwords for computer-based user authentication may be established by the user. FIG. 4 illustrates an exemplary process 400 for establishing a verification image and a key to be associated with it. In one embodiment, in a stage 410, using the processor 130 and the communication module 240, a request may be received from a user to set up an image-based password for a challenge verification image. In response to receiving the request, in a stage 420, a set-up module 270 may access information pertaining to the user with a profile module 220 and prepares to receive the user's selection of a challenge verification image.

In a stage 430, the user may select the challenge verification image with the user interface. The user interface may be any conventional interface, with a keyboard, screen, mouse, touch screen, and any other useful components. The number of verification images to be established by a user may be any number desired by the designer of the set-up system 110. For example, the designer may choose to allow for 2-10 verification images. The verification image may be any suitable image having one or more potential target locations. For example, it may be a photo or drawing, or it may be a group of photos or drawings. It may comprise a landscape, such as a beach scene, a mountain scene, or a city-scape.

The verification image candidates may be stock images stored on storage 115 for display to and use by the user, or they may be clip art images stored at any suitable location accessible from across the Internet 150. Alternatively, the set-up system 110 may allow for a user to access personal verification images or to upload them into storage 115 using the profile module 220, the communications module 240, and the user information module 116 associated with the server 130. It may allow for the user to browse personal files to select desired verification images or to scan desired images (through a scanning device 125). Further, using the profile module 220, the communications module 240, and the user information module 116, the set-up system 110 may allow for a user to create a collage of any suitable verification image candidates to use as a verification image.

Accordingly a verification image may be a family portrait (the user's or any other family) containing multiple individuals or props, or it may be a portrait of people or pets. It may be a collage of photos or drawings of flowers, trees, office supplies, dinosaurs, toys, or lighthouses, combined by the user into a customized verification image collage.

The image-based set-up system may present random verification image candidates to the user, or it may allow the user to browse through the user's stored personal verification images on storage 115 or across the Internet 150 to select a verification image.

The user may select the challenge verification image from among verification image candidates presented to the user interface with the presentation module 250 and the communications module 240, or the communications module 240 may allow the user to submit the challenge verification image through the user interface. Alternatively, the user may choose one of her previous verification images in order to change the key definition associated with the previous verification image. Further, in other embodiments, the stage 430 may allow the user to select a verification image already stored as a verification image/key definition combination in storage 115 in order to reset the key for the selected verification image.

Figure 5A:
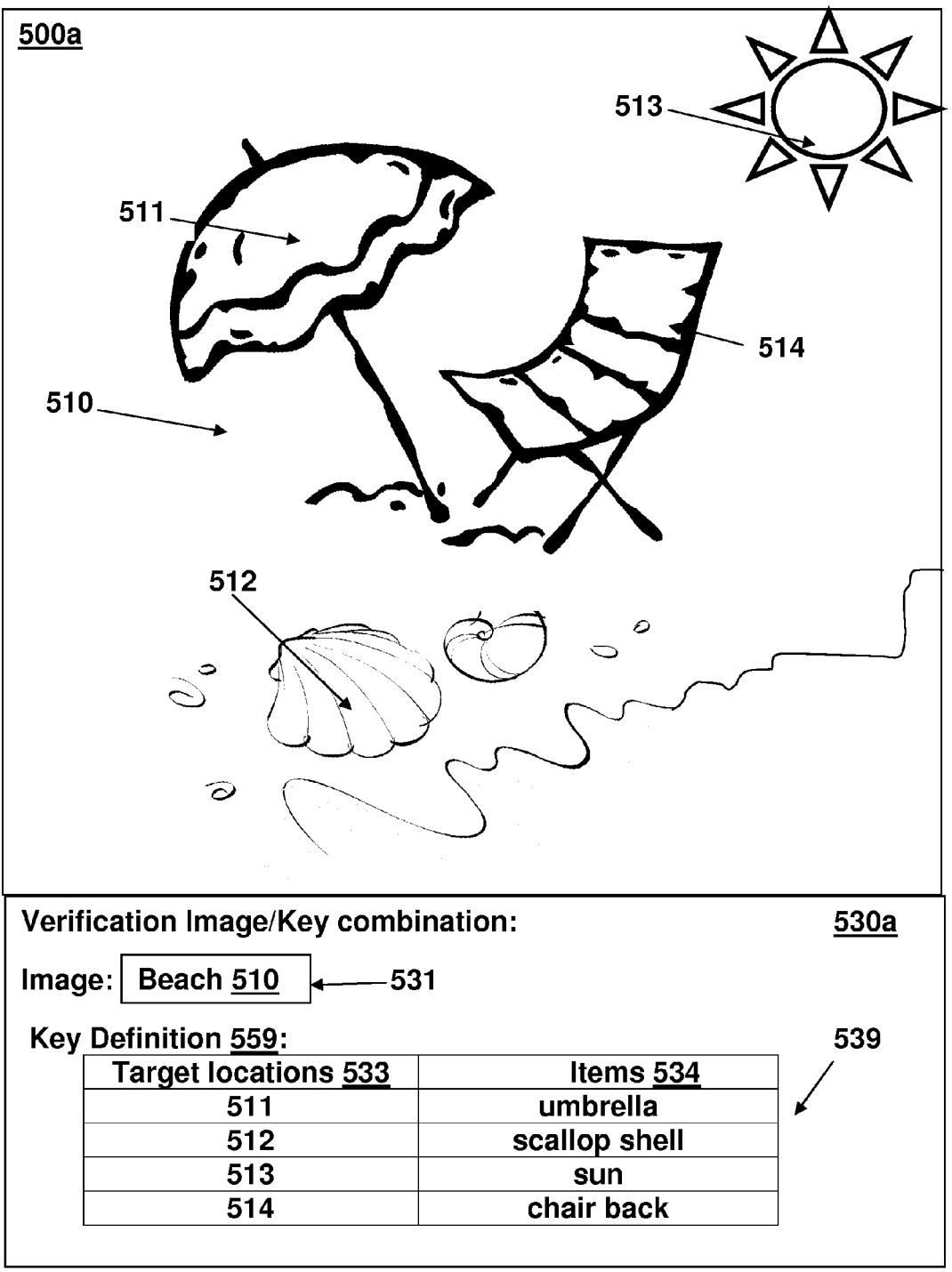
FIG. 5a is a diagrammatic representation of a display screen 500a on a user's interface, displaying a verification image for use in conjunction with the user verification application of FIG. 4.
Figure 5B:
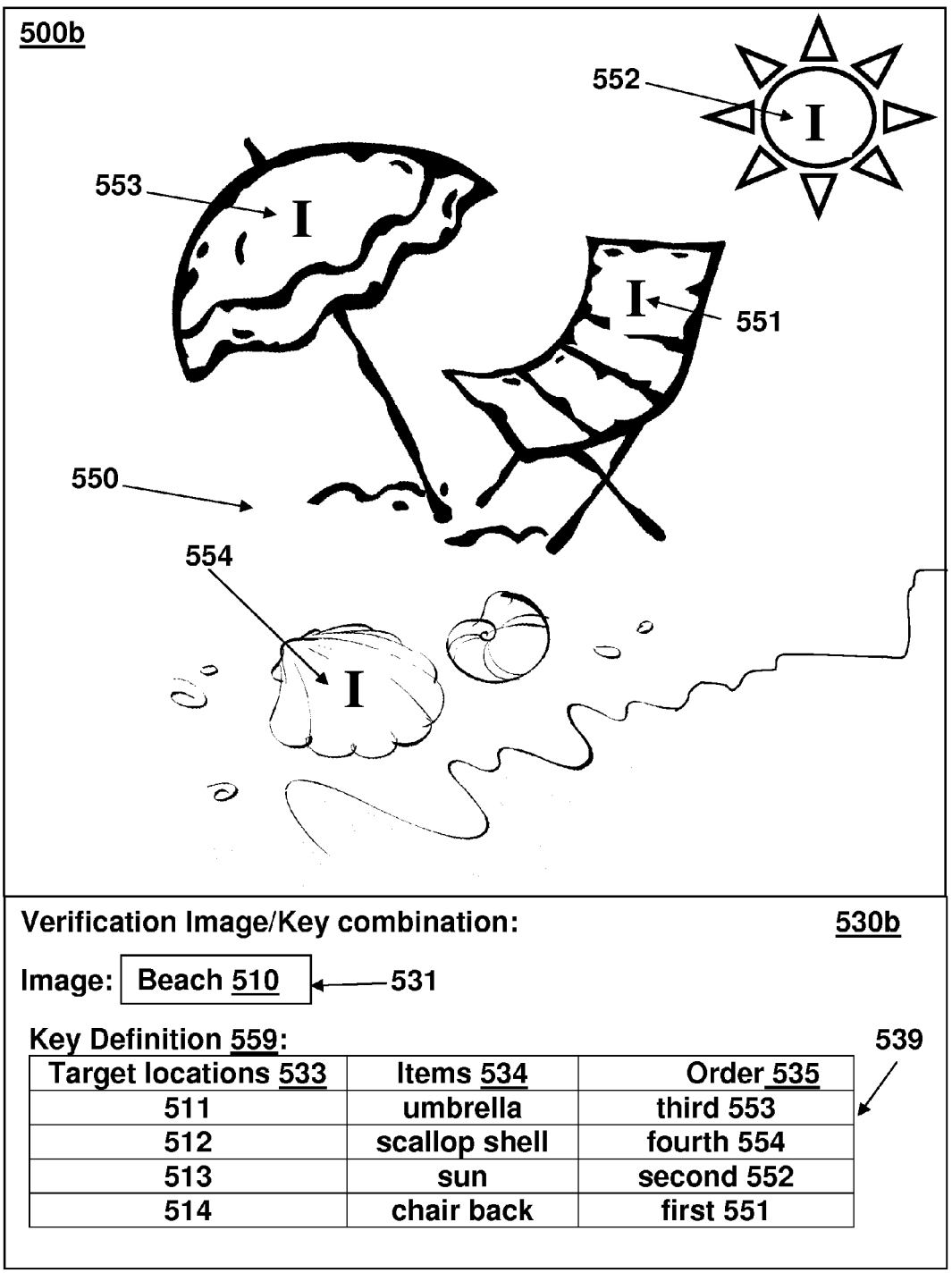
FIG. 5b is a diagrammatic representation of the display screen 500b, with an image-based and ordered selection key applied thereto.

FIGS. 5a, 5b are diagrammatic representations of a display screen on a user's interface, displaying an exemplary verification image for use in conjunction with the user verification application of FIG. 4. FIG. 5a shows the display screen 500a showing an exemplary verification image 510 and a key definition section 530 during the process of the user applying a image-based key 550 to the image 510, and FIG. 5b shows the display screen 500b with an exemplary image-based key 550 applied to an exemplary verification image 510. As shown in FIG. 5a, the user may select a beach scene as a verification image 510, which is being displayed on display screen 500a.

Returning to FIG. 4, when the challenge verification image is accepted, in a stage 440, with an action capture module 260 and the communications module 240, the user may create a challenge key to be associated with the challenge verification image and submit the challenge key definition for the challenge key through the user interface. The user may then move to establish the components of the key 550 to be associated with the selected verification image.

The key may be a set of actions to be performed on target locations on the selected verification image, and a key definition may be an identification of the set of actions on the target locations that make up the key. The number of target locations in the key to be created for verification image 510 may be any number desired by the designer of the set-up system. For example, the designer may choose to allow 3-8 target locations.

Returning to FIG. 5a, at the user's discretion, once the image 510 is selected, the user may select the target locations components of the key 550 to be associated with the selected verification image 510. The selection may occur in any manner suitable for the user and system designer. For example, the selection may occur by selecting the target location with a computer input device, such as a mouse, track ball, or joy stick. If the user interface has a touch screen, the selection may occur by tapping on or touching the target location. The communications module 240 and an action capture module 260 may be used with the user interface to record the selected actions. In the exemplary embodiment of FIG. 5a, the user may select the umbrella as target location 511, the scallop shell as target location 512, the sun as target location 513, and the chair back as target location 514.

The set of actions that the user defines to be the key definition 535 may be recorded in a verification image/key definition combination section 530a of the display screen 500a. The section 530a may or may not be shown to the user during definition. The section 530a has a verification image field 531 where an identifier for image 510 may be displayed. The section 530a also has a key definition field 539 for displaying the key definition 559 for the key 550. As shown in FIG. 5a, the key definition field 539 may display the target locations 511, 512, 513, 514 in a locations field 533 and their respective associated items umbrella, scallop shell, sun, and chair back in an items field 534.

For additional security, the key 550 may also have an additional component such as selecting target locations in a predetermined selection order in order to form a series of actions to be performed on a verification image. An exemplary selection order for the series of actions is shown in FIG. 5b, in a Verification Image/Key Definition combination section 530b of a display screen 500b. The section 530b may have an order field 535 in key definition field 539 for displaying the order in which the actions associated with the target locations 511, 512, 513, 514 may occur. For example, in the exemplary key 550, as shown in the order field 535, the target locations 511, 512, 513, 514 may be selected in the following order: first selection 551 at target location 514, second selection 552 at target location 513, third selection 553 at target location 511, and fourth selection 554 at target location 512, respectively.

Figure 5C:
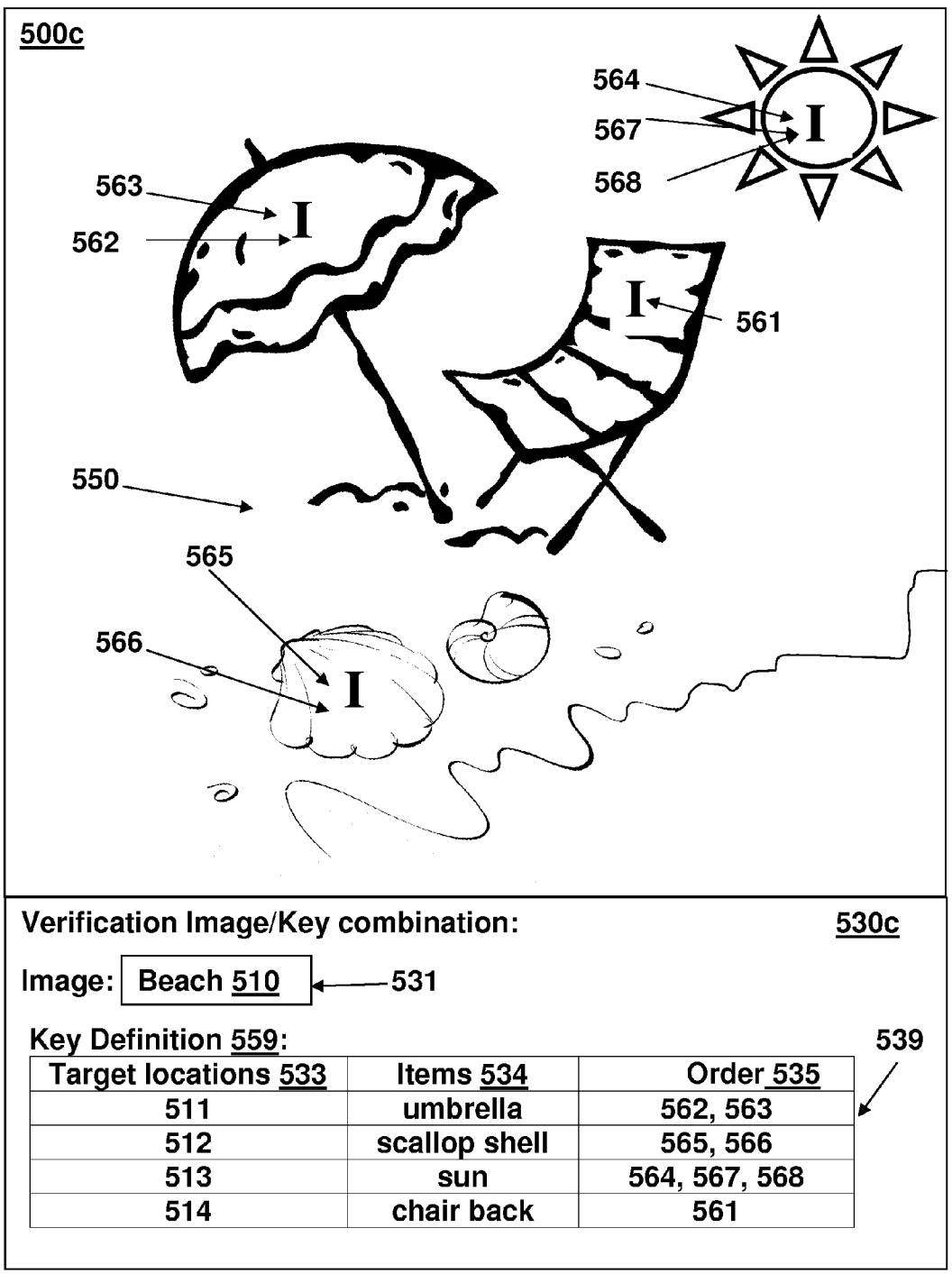
FIG. 5c is a diagrammatic representation of the display screen 500c, with an image-based, and ordered multi-touch selection key applied thereto.

For additional security, the key 550 may also allow the target locations to be selected multiple times, either sequentially or again after another target location is selected during the series of actions. An exemplary selection order for the series of actions in which target locations may be selected multiple times is shown in FIG. 5c, in a Verification Image/Key Definition Combination section 530c of a display screen 500c. The order field 535 of the key definition field 539 may display the multiple times that an associated action may occur. For example, in the exemplary key 550, the target locations 511, 512, 513, 514 may be selected in the following order: first selection 561 on the chair back, second selection 562 and third selection 563 at on the umbrella, fourth selection 564 on the sun, fifth selection 565 and sixth selection 566 on the scallop shell, and seventh selection 567 and eighth selection 568 back to the sun.

In one embodiment, the key associated with the selected verification image is unique. In other embodiments, keys for different verification images could be identical or similar. The series of actions to be performed on the selected verification image may have at least one of the following key components: selecting at least one target location on a selected verification image, as shown in FIG. 5a, selecting target locations in a predetermined selection order as shown in FIG. 5b, or selecting the target locations with a predetermined selection pattern as shown in FIG. 5c.

For additional security, in a further embodiment, the set of actions may also include selecting at least one overlay with which to cover the at least one target location or superimposing a target location with a selected overlay. The series of actions may also include covering the target locations with one or more overlays in a predetermined superimposing order; or covering the target locations with the overlays in a predetermined superimposing pattern. For even further security, once a target location is covered with an overlay, the overlay may fade out or vanish, either immediately upon being applied or with a delay.

Figure 6:
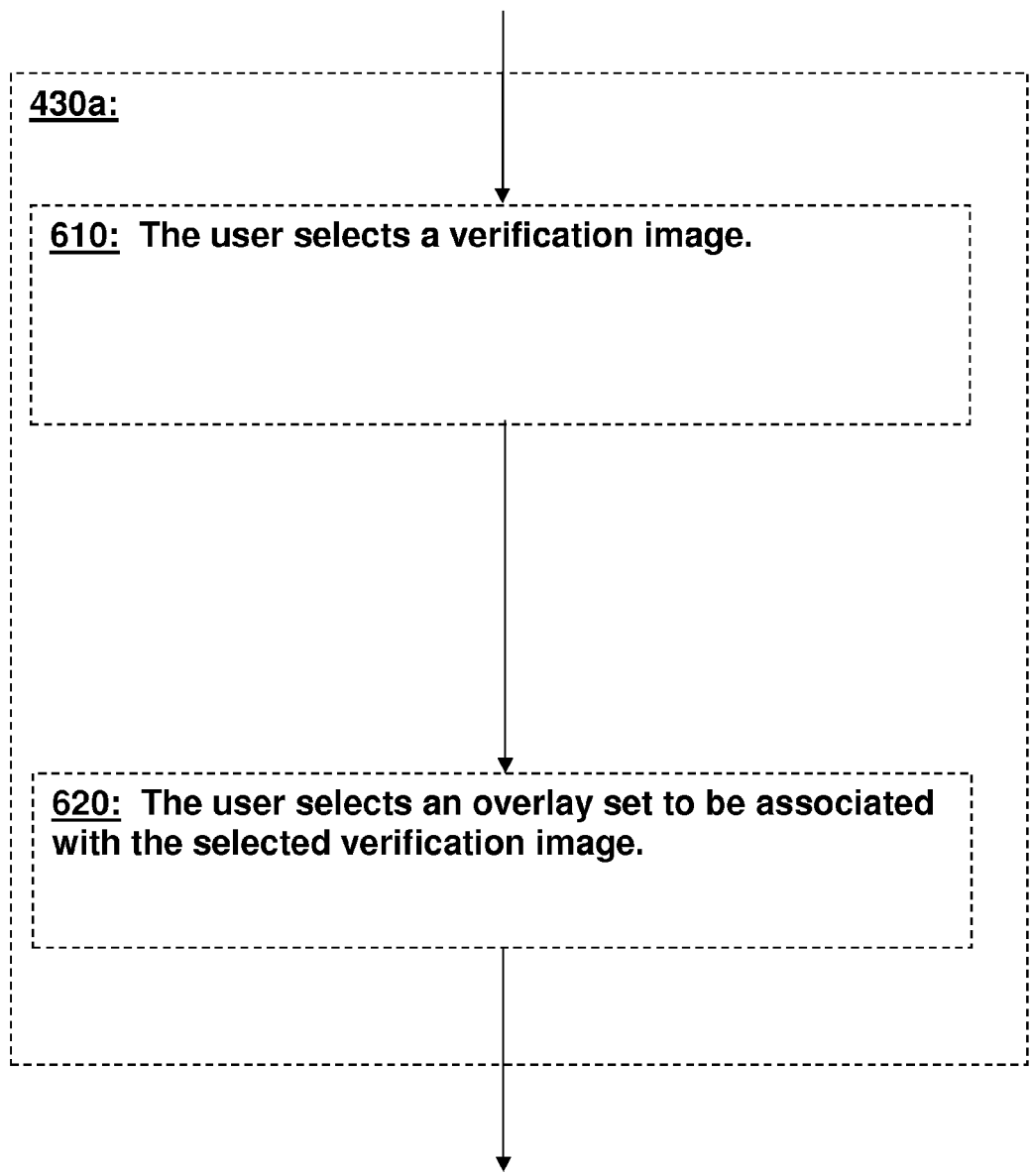
FIG. 6 is a block diagram of an alternative embodiment of a stage for the user selecting a verification image/key definition combination in the log-in image set-up application of FIG. 4.

FIG. 6 is an alternative embodiment of a stage 430a for the set-up process 400, in which the user establishes a key for a verification image using target locations and overlays. Stage 430a may have a stage 610, in which the user selects a verification image, and a stage 620, in which the user selects an overlay set to be associated with the selected verification image.

Figure 7A:
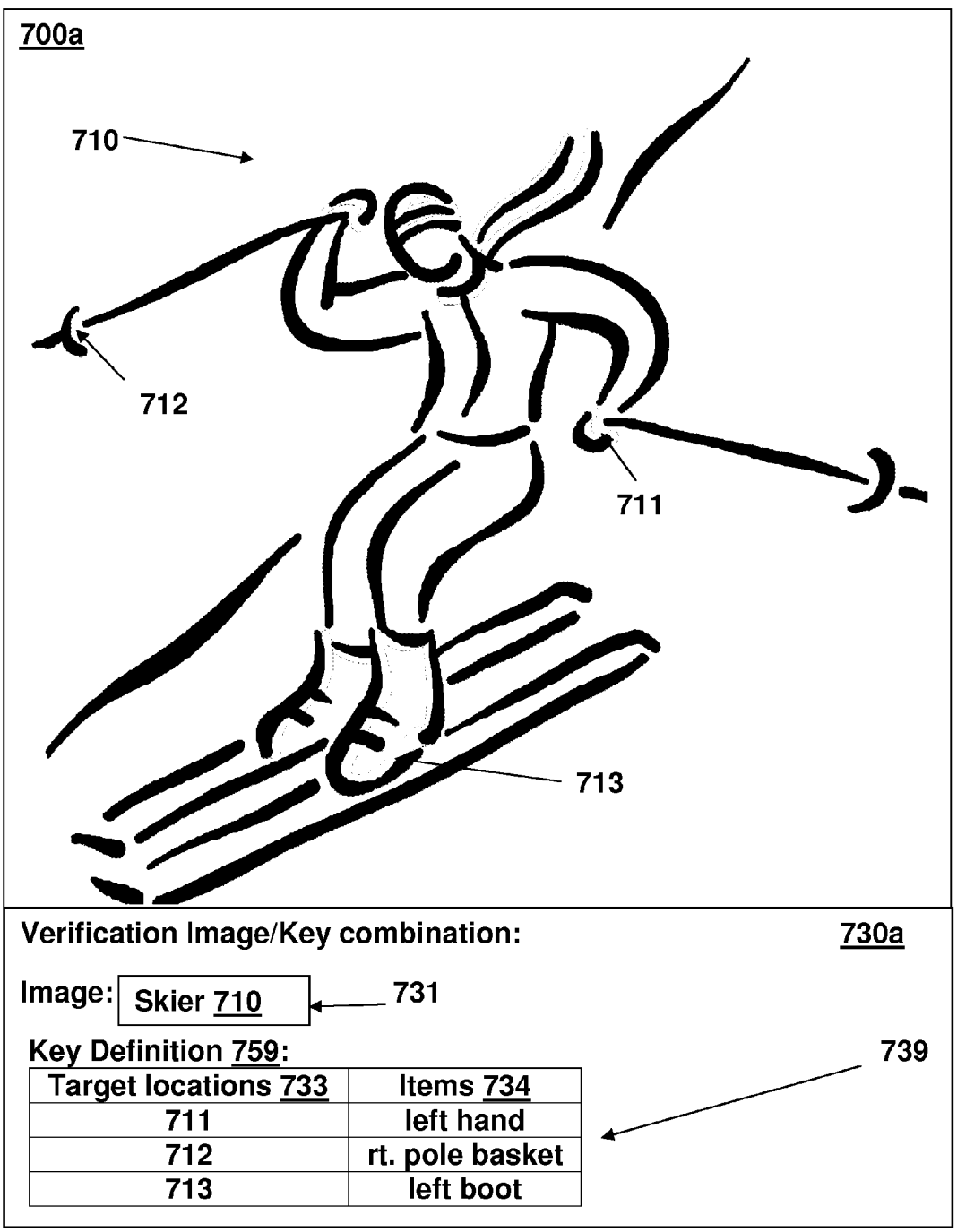
FIG. 7a is a diagrammatic representation of a display screen 700a on a user's interface, displaying an exemplary verification image for use in conjunction with the user verification application of FIGS. 4 and 6.
Figure 7B:
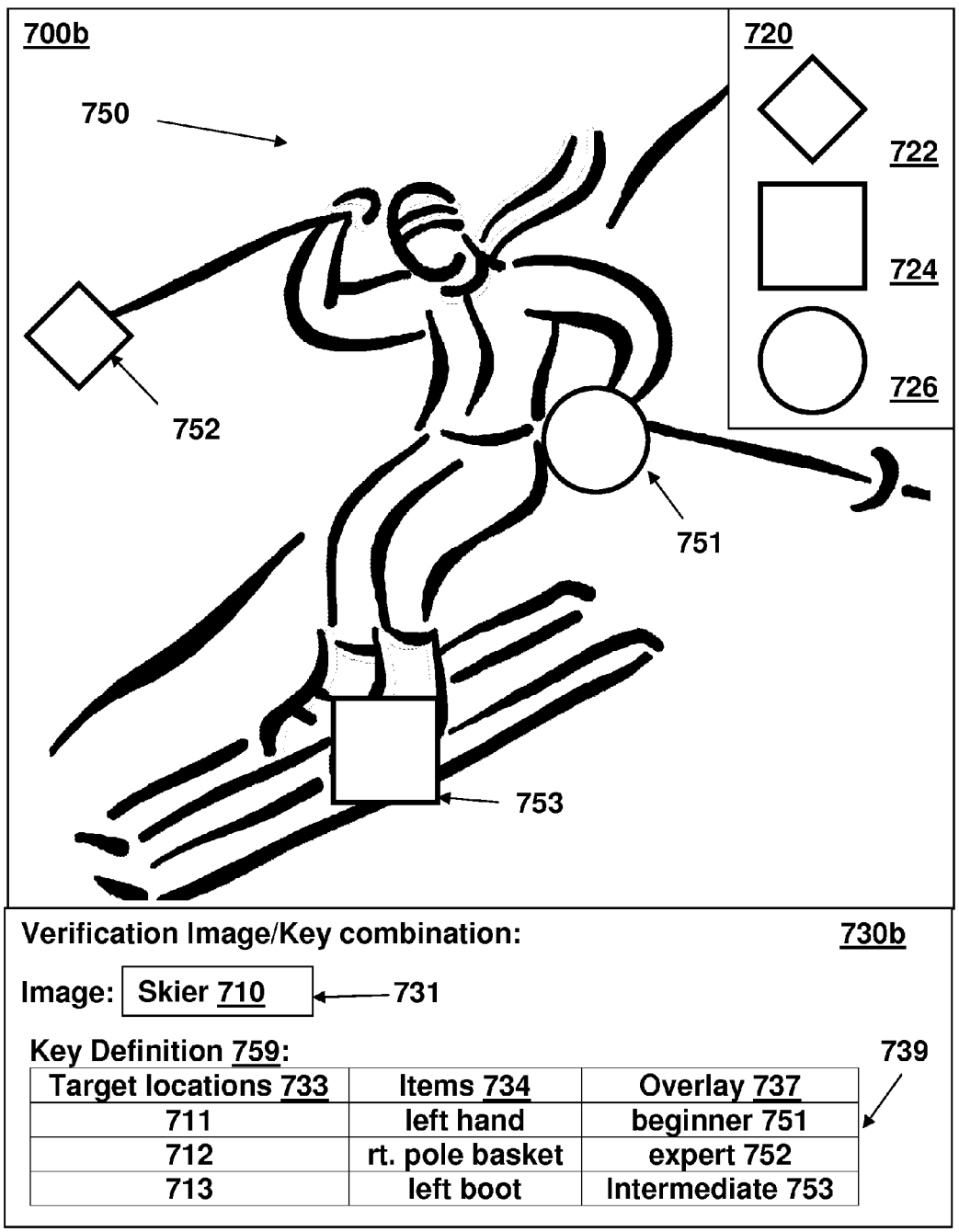
FIG. 7b is a diagrammatic representation of the display screen 700b, with an exemplary image-based and overlay-based key applied thereto.
Figure 7C:
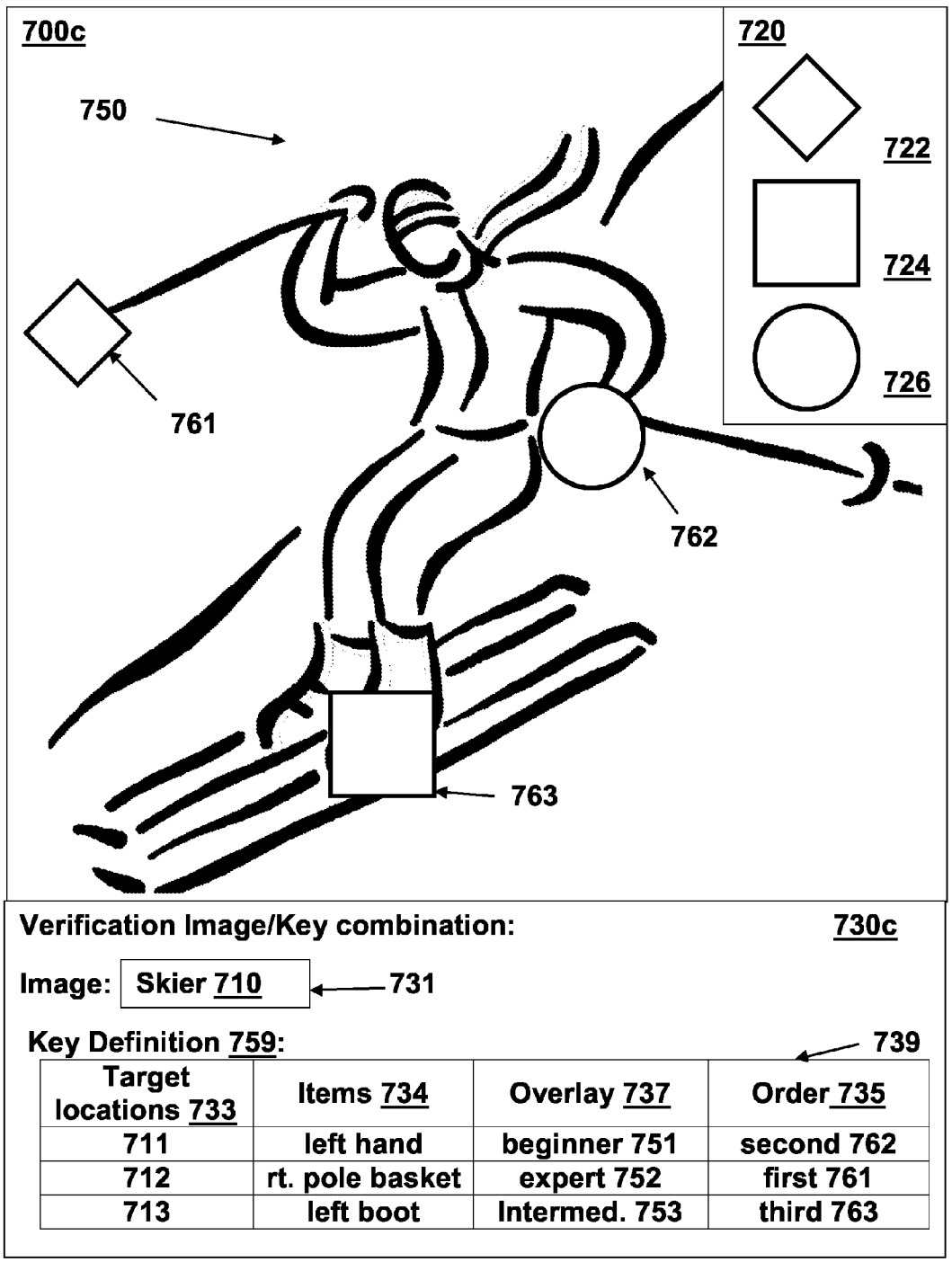
FIG. 7c is a diagrammatic representation of the display screen 700c, with an exemplary image-based, overlay-based, and ordered selection key applied thereto.

FIGS. 7a, 7b, 7c are diagrammatic representations of a display screen on a user's interface, displaying a verification image for use in conjunction with the user verification application of FIG. 4. FIG. 7a shows the display screen 700a before the user applies the key to the image, and FIG. 7b shows the display screen 700b with an image-based and overlay-based key applied to the verification image. FIG. 7c is a diagrammatic representation of the display screen 700c, with an image-based, overlay-based, and ordered selection key applied thereto. In FIGS. 7a, 7b, 7c the selected verification image 710 is a skier.

At the user's discretion, once the image 710 is selected in a stage 610, the user may select the target locations components of the key 750 to be associated with the selected verification image 710 in a stage 620, using the process described above.

The set of actions that the user defines to be the key definition 735 may be recorded in the Verification Image/Key definition combination section 730a of the display screen 700a. The section 730a may have a verification image field 731, to identify the image 710 may be displayed, and a key definition field 739 for displaying the key definition 759 for the key 750, displaying the target locations 711, 712, 713 in a locations field 733 and their respective associated items, the skier's left hand, the skier's right pole basket, and the skier's left boot in an items field 734.

For additional security, the key 750 may also have an additional component such as overlaying the selected target locations. The overlays may be any suitable image or set of images. An overlay may be any image (photos, drawings, icons, or shapes), or a set of related symbols may be chosen to form a set of overlays. For example, card suit symbols, ski trail symbols, sports logos, emoticons, musical notation, numbers, or letters are all possible candidates to serve as a set of overlays. The image-based set-up system may allow for the user to choose overlays in any manner, such as those disclosed above for selecting verification images, including a user selecting personal overlays or choosing stock overlays stored in a database in storage 115 for display to and use by the user.

An exemplary set of overlays for the key 750 is shown in FIG. 7b, in an overlay field 720 of a display screen 500b. In the exemplary embodiment shown in FIG. 7a, the set of symbols for ski trails forms the set of overlays. The expert trail symbol, a diamond, may be selected by the user for overlay 722, the intermediate trail symbol, a square, may be selected by the user for overlay 724, and the easiest trail symbol, a circle, may be selected by the user for overlay 726.

The user may then associate the overlays 722, 724, 726 with the selected target locations, for example, associating overlay 722 with target location 712 (the skier's left hand) to form an overlay selection 751, associating overlay 724 with target location 714 (the skier's right pole basket) to form an overlay selection 752, and associating overlay 726 with target location 716 (the skier's left boot) to form an overlay selection 753. The user may perform the associations using the action capture module 260 and communication module 240. The section 730b may have an overlay field 735 in the key definition field 739 for displaying the overlay selections 751, 752, 753 for the target locations 711, 712, 713.

For additional security, the key 750 may also have additional components such as selecting target locations in a predetermined selection order (as shown with reference to FIG. 7c). A key having a series of actions in which overlays are superimposed over target locations in a selected order is shown in FIG. 7c, in a Verification Image/Key Definition Combination section 730c of a display screen 700c. The order field 735 of the key definition field 739 may display the order that an associated action may occur. For example, in the exemplary key 750, the target locations 711, 712, 713 may be superimposed by overlays in the following order: first selection 761 on the skier's right pole basket, second selection 762 on the skier's left hand, and third selection 763 on the skier's left boot.

The action taken by the user in establishing the key either may be chosen by the system designer or the user; in either case, it may be implemented with the action capture module 260 and the communication module 240. For example, the selected overlays may be superimposed on the target locations in their intended order of action in the key definition. Alternatively, they first may be superimposed on the target locations, and in a second step, the overlays may be selected on the target locations in a specific order to define the order of selection for the key. Further alternatively, the user may fill in a table such as one disclosed below with reference to FIG. 8b to define target locations, overlay and order of action.

In further embodiments, superimposing overlays may be performed dragging an overlay to over a target location, or it may occur by cursor—selecting an overlay, and then selecting a target location to accomplish the superimposing activity. Selecting overlays may occur in the same manner as disclosed above for selecting target locations. It may be understood that selected overlays for superimposing over target locations may be unique.

Figure 8A:
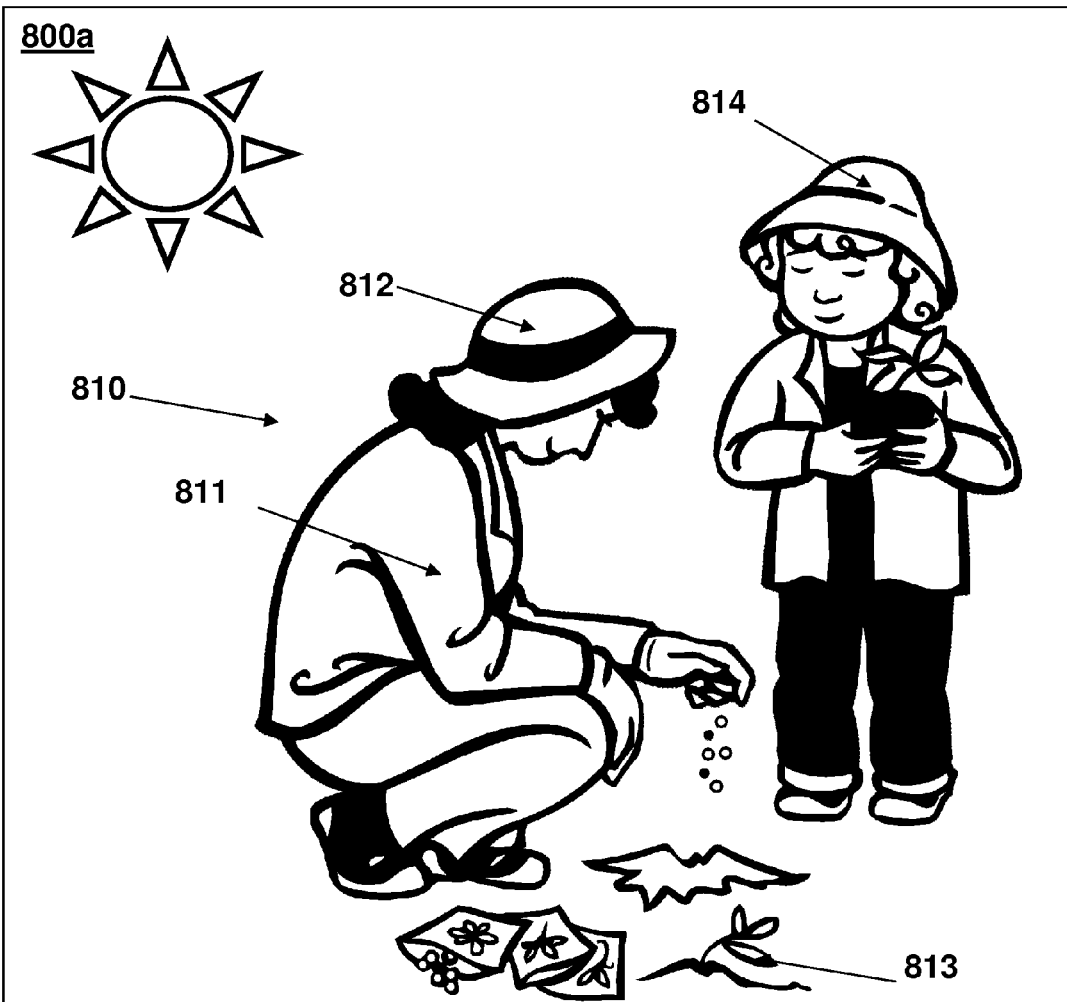
FIG. 8a is a diagrammatic representation of a display screen on a user's interface, displaying another verification image for use in conjunction with the user verification application of FIGS. 4 and 7.
Figure 8B:
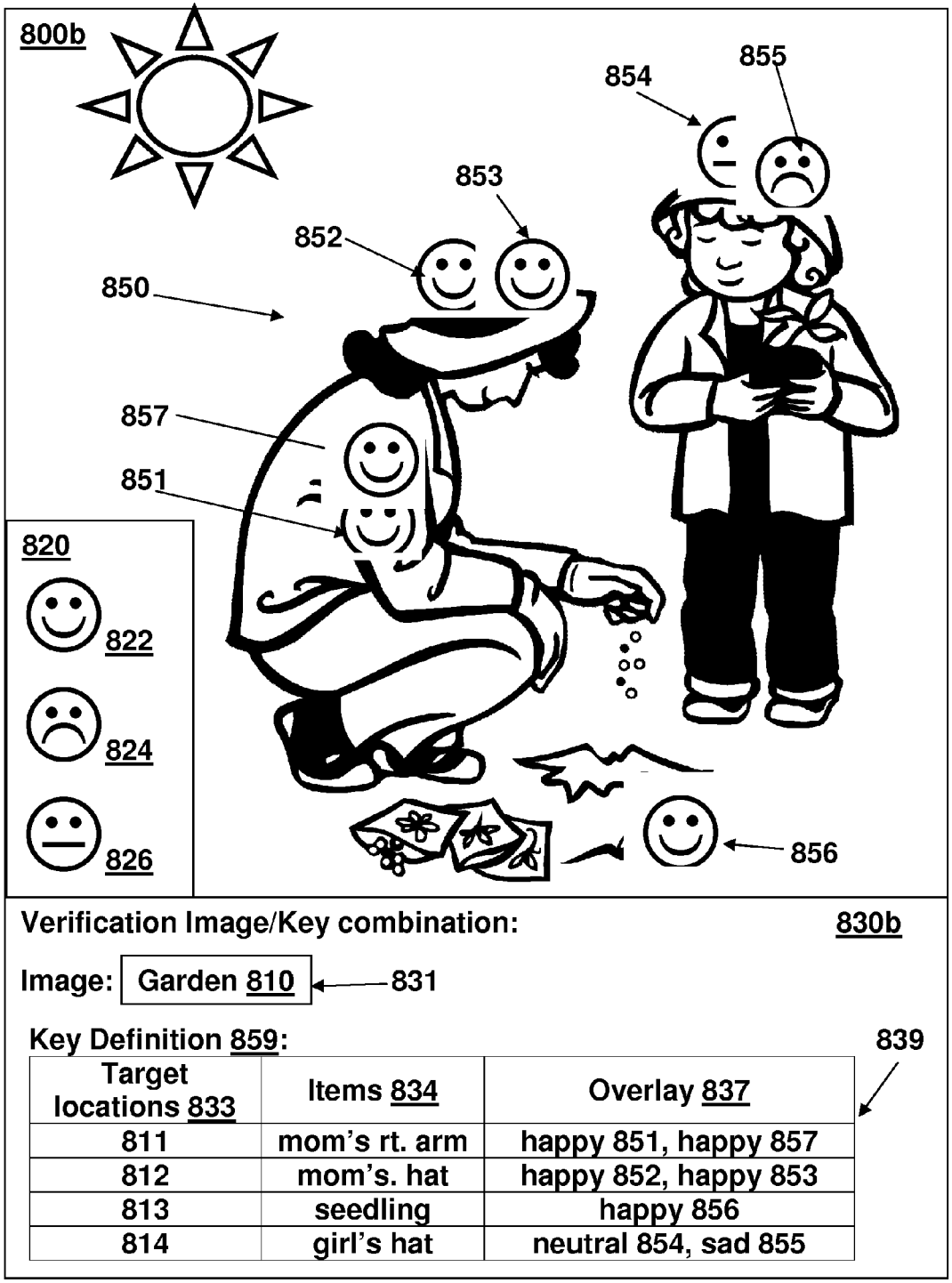

FIGS. 8a, 8b are diagrammatic representations of a display screen on a user's interface, displaying another embodiment of a verification image for use in conjunction with the user verification application of FIG. 4. FIG. 8a shows the display screen 800b with an image-based, overlay-based, ordered selection, and multi-selection pattern key applied to the verification image. In FIGS. 8a, 8b, the selected verification image 810 is a mother and daughter gardening.

The set of actions that the user defines to be the key definition 835 may be recorded in the verification image/key definition combination section 830a of the display screen 800a. The section 830a may have a verification image field 831, to identify the image 810, and a key definition field 839 for displaying the key definition 859 for the key 850, displaying the target locations 811, 812, 813, 814 in a locations field 833 and their respective associated items, the mother's right arm, the mother's hat, the seedling, and the girl's hat, in an items field 834.

The key 850 may also have overlays for superimposing the selected target locations. An exemplary set of emoticon overlays for the key 850 is shown in FIG. 8b, in an overlay field 820 of a display screen 800b. A happy face may be selected by the user for overlay 822, sad face for overlay 824, and a neutral face for overlay 826.

The user may develop a key in which multiple target locations are covered with multiple overlays in a superimposing pattern. For example, the user may make the following overlay selections: associate overlay 822 (the happy face) with target location 811 (the mother's right arm) to form a first overlay selection 851, associating overlay 822 with target locations 811, 812 (the mother's hat) to form a second overlay selection 852 and third overlay section 853, and so on as outlined in the following chart. As shown in FIG. 8b, the section 830b may have an overlay field 837 in the key definition field 839 for displaying the overlay selections 851-857 for the target locations 811-814.

| Action Order | Target Location | Overlay |
| --- | --- | --- |
| first overlay selection 851 | mother's right arm 811 | happy face 822 |
| second overlay selection 852 | mother's hat 812 | happy face 822 |
| third overlay selection 853 | mother's hat 812 | happy face 822 |
| fourth overlay selection 854 | girl's hat 814 | neutral face 826 |
| fifth overlay selection 855 | girl's hat 814 | sad face 824 |
| sixth overlay selection 856 | seedling 813 | happy face 822 |
| seventh overlay selection 857 | mother's right arm 811 | happy face 822 |

The predetermined superimposing order for covering the target locations with overlays may be unique for each image. Alternatively, the user may choose to have an identical or similar pattern for each image. Thus, it may be seen that a target location may be covered only once, or it may be covered multiple times with the same or a different overlay, either sequentially or again after another target location is covered during the series of actions.

Returning to FIG. 4, in response to receipt in a stage 450 by the set-up system 110 of the challenge key definition, the key definition may be associated in a stage 460 with the challenge verification image using the set-up module 270 to form a new verification image/key definition combination. In a stage 470, information related to the new verification image/key definition combination may be stored with the user information on the storage 115 by the storage module 280 and the user information module 116 associated with the server 130.

Further, in other embodiments, a stage 480 may be provided to allow for review, proofreading, editing, and/or approval of verification image/key definition combinations. In a stage 410, using the processor 130 and the modules of the set-up application 132, one or more verification image/key definition combinations may be retrieved from the storage 115 and presented to the user to allow for review, proofreading, editing, and/or approval activities. If changes are made, information related to any updated verification image/key definition combinations may be stored with the user information on the storage 115 by the storage module 280 and the user information module 116 associated with the server 130.

FIG. 9 illustrates an exemplary process 900 for conducting computer-based user authentication in which a user performs a set of actions on at least one verification image on a display screen. In one embodiment, in a stage 910, using the processor 190 and the communication module 340, a request is received from a user to access an application on a computer system. In response to receiving the request to access an application, in a stage 920, the key verification module 360 may access information pertaining to the user. The user information, including a plurality of verification image/key definition combinations, may be accessed from a user information module 176 on the server 190.

In a stage 930, with the presentation module 350, a verification image may be selected from the plurality of verification image/key definition combinations and presented to a user interface for review by the user. The user interface may be the same user interface as is used in the key set-up process or may be a separate verification user interface. The verification system may select the verification image to be displayed randomly or in any suitable way. Further, the verification system may display a different verification image each time that a user attempts verification.

The user interface may have a reselect button to allow the user to select another verification image if the user forgets the key to be associated with a displayed verification image or for other reasons wants to input a key onto a different verification image. For additional security, the number of times that a user may operate the reselect button or attempt to log in may be limited such that the user is prevented from logging in after a selected number of attempts. The user interface may also have a hint button to allow the user to request that a hint about the key associated with the displayed verification image is sent to the user's email or cell phone. The hint may be a portion of or all actions in the key definition. The key may be presented to the user in the form of a chart such as disclosed above in reference to key 850. Additional security, such as correct responses to challenge questions, may be required in order to preserve the confidentiality of the key definition.

When the user in a stage 940 inputs the key associated with the presented verification image with the user interface, the user interface may submit the inputted key in a stage 950 by communicating via the communication module 340 with the key verification module 360. The user may input the key associated with the displayed verification image by performing the set of actions on the verification image in the same manner as selected and captured for the displayed verification image set during the set-up stage.

In a stage 960, the inputted key may be verified with the key verification module 360 by comparing the inputted key with the key definition associated with the presented verification image. The verification system provides verification when the key performed on the verification image matches the stored key associated with the verification image.

In response to the presentation module 350 verifying the inputted key, in a stage 970 an access module 370 generates an authorization that allows the user to access the application and the user is provided access to the application.

It may be seen that the embodiments of the systems and methods disclosed here may be used to greatly facilitate remembering passwords and logging in computer-based social networks. The described system, which revolves around the image-based authentication, may provide more discreet and secure logins.

One of skill in the art will appreciate that the above-described stages may be embodied in distinct software modules. Although the disclosed components have been described above as being separate and consolidated units, one of ordinary skill in the art will recognize that functionalities provided by one or more units may be combined or separated, at the option of the developer. As one of ordinary skill in the art will appreciate, one or more of units may be optional and may be omitted from implementations in certain embodiments. For example, the computer 120 may have an application, not shown, having modules that are similar to the modules of application 162 in order to allow for the operation of the set-up system 110 and verification system 170.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations may be implemented in software, hardware, or a combination of hardware and software. Examples of hardware include computing or processing systems, such as personal computers, servers, laptops, tablets, mainframes, micro-processors, and processing systems within so-called "smart" phones. It is intended that the specification and examples be considered as exemplary only, with a true scope and spirit of the invention being indicated by the following claims.

The invention claimed is:

1. A system for computer-based user authentication, comprising:
   a processor;
   a user interface; and
   a non-transitory computer-readable medium encoding instructions for computer-based user authentication and for execution by the processor, the instructions including:
      a communication module configured to receive, in conjunction with the processor, a request from a user to access an application on a computer system,
      a verification module configured to access user information pertaining to the user in response to the request to access the application,
      a user information module configured to hold the user information on a server,
         the user information comprising information related to a plurality of verification image/key definition combinations that are associated with the user and that are concurrently available to the processor to use in confirming user access rights to the application,
         wherein a challenge verification image/key definition combination among the plurality of verification image/key definition combinations has associated therewith:
            a challenge verification image with a set of challenge target locations comprising a portion of locations on the challenge verification image,
            a challenge key comprising a set of challenge actions to be performed on a display of the challenge verification image at the challenge target locations by a user using the user interface, and
            a key definition comprising an identification of the set of challenge actions and the set of challenge target locations that make up the challenge key;
      a presentation module
         configured to select a login verification image from among the challenge verification images in the plurality of verification image/key definition combinations, configured to present a display of the selected login verification image to the user interface for review by the user, and configured to submit, with the user interface and the communication module, an access key comprising login actions inputted by the user on the display of the selected login verification image at login locations on the selected login verification image;

a key verification module configured to verify the inputted access key by comparing the inputted access key with the challenge key defined in the key definition associated with the selected login verification image, wherein the comparing comprises determining an identity between the login actions and the challenge actions associated with the login verification image and between the login locations and the challenge target locations associated with the login verification image; and an access module configured to generate an authorization to allow the user to access the application in response to the key verification module verifying the inputted access key.

2. The system of claim 1, wherein, in the plurality of verification image/key definition combinations, one challenge key associated with one verification image is unique.

3. The system of claim 1, wherein the challenge key associated with the challenge verification image is established by the user, and wherein the communication module is further configured to receive, with the processor, a request from a user to set up an image-based password for the challenge verification image for user authentication, and further comprising a set-up module configured to access the user information pertaining to the user in response to receiving the request to set up the image-based password, an action capture module configured to operate with the communications module and the user interface to allow the user to create the challenge key to be associated with the challenge verification image, and to submit the key definition for the challenge key, wherein the challenge verification image is selected by the user, wherein the set of challenge target locations for the challenge key is chosen by the user, and wherein the set of challenge actions for the challenge key is chosen by the user;

the set-up module further configured, in response to receipt of the key definition, to associate the key definition with the selected challenge verification image to form a new verification image/key definition combination; and a storage module configured to store, with the user information on the server, information related to the new verification image/key definition combination.

4. A system for establishing image-based passwords for computer-based user authentication, comprising:

a processor;

a user interface; and a non-transitory computer-readable medium encoding instructions for computer-based user authentication and for execution by the processor, the instructions including:

a communication module configured to receive, with the processor, a request from a user to set up an image-based password for user authentication on a computer system;

a user information module configured to store, on a server, user information pertaining to the user, the user information comprising information related to a plurality of verification image/key definition combinations associated with the user, wherein the plurality of verification image/key definition combinations are concurrently available to the processor for use in confirming user access rights to the application;

a set-up module configured to access the user information on the server in response to receiving the request to set up an image-based password;

an action capture module configured to allow, with the communication module, the user to create a key to be associated with a verification image and to submit a key definition for the key through the user interface, wherein the key comprises a set of actions to be performed on a display of the verification image at a set of target locations on the verification image by a user using the user interface, with the set of target locations comprising a portion of locations on the verification image, and wherein the key definition comprises an identification of the set of actions and the set of target locations that make up the key; and a storage module configured to store information related to the verification image and the key definition associated therewith as a new verification image/key definition combination associated with the user information on the server.

5. The system of claim 4, wherein at least one of the presentation module and the communications module are configured to perform at least one of the following activities:

display verification image candidates to the user interface for review and selection as the verification image by the user, allow the user to submit a new verification image through the user interface, and display one of the user's previous verification images, comprising one of the verification images already associated with the user information stored on the server, in order to allow the user to establish a new key definition to be associated with the one of the user's previous verification images.

6. A method for computer-based user authentication, comprising receiving, using a processor and a communication module, a request from a user to access an application on a computer system;

in response to receiving the request to access the application, accessing user information pertaining to the user by a verification module, wherein the user information is accessed from a user information module on a server, wherein the user information comprises information related to a plurality of verification image/key definition combinations that are associated with the user and that are concurrently available to the processor to use in confirming user access rights to the application, and wherein a challenge verification image/key definition combination among the plurality of verification image/key definition combinations has associated therewith:

a challenge verification image with a set of challenge target locations comprising a portion of locations on the challenge verification image, a challenge key comprising a set of challenge actions to be performed on a display of the challenge verification image at the challenge target locations by a user using the user interface, and a key definition comprising an identification of the set of challenge actions and the set of challenge target locations that make up the challenge key;

with a presentation module, selecting a login verification image from among the challenge verification images in the plurality of verification image/key definition combinations;

with the presentation module, presenting a display of the selected login verification image to a user interface for review by the user;

the user inputting an access key comprising login actions performed by the user on the display of the selected login verification image at login locations on the selected login verification image with the user interface;

the user interface submitting the inputted access key by communicating via the communication module with the verification module;

verifying the inputted access key with a verification module by comparing the inputted access key with the challenge key defined in the key definition associated with the selected login verification image, wherein the comparing comprises determining an identity between the login actions and the challenge actions associated with the login verification image and between the login locations and the challenge target locations associated with the login verification image; and in response to the key verification module verifying the inputted access key, generating with an access module an authorization that allows the user to access the application, and providing the user access to the application.

7. The method of claim 6, wherein, in the plurality of verification image/key definition combinations, one challenge key associated with one challenge verification image is unique.

8. The method of claim 6, wherein the set of challenge actions to be performed on the display of the challenge verification image comprises at least one of the following actions:

selecting at least one challenge target location on the display of the challenge verification image;

selecting the challenge target locations in a selected order;

selecting the challenge target locations with a selected pattern;

selecting at least one overlay with which to cover the at least one challenge target location;

superimposing one challenge target location with a selected overlay;

covering the challenge target locations with the overlays in a selected superimposing order; and covering the challenge target locations with overlays in a selected superimposing pattern.

9. The method of claim 8, wherein selecting the at least one challenge target location on the display of the selected challenge verification image comprises at least one of the following actions:

tapping on the at least one challenge target location;
touching the at least one challenge target location; and
selecting the at least one challenge target location with a computer input device.

10. The method of claim 8, wherein, in the plurality of verification image/key definition combinations, one challenge target location associated with one challenge verification image is unique.

11. The method of claim 8, wherein one selected order for selecting the challenge target locations in one selected challenge verification image is unique.

12. The method of claim 8, wherein one selected pattern for selecting the challenge target locations in one selected challenge verification image is unique relative to another selected pattern for selecting challenge target locations in another selected challenge verification image.

13. The method of claim 12, wherein the one selected pattern comprises selecting at least one of the challenge target locations multiple times.

14. The method of claim 8, wherein one selected overlay for superimposing over one challenge target location is unique.

15. The method of claim 8, wherein one selected superimposing order for covering one set of challenge target locations with the at least one overlay is unique.

16. The method of claim 8, wherein one selected superimposing pattern for covering one set of the challenge target locations with the at least one overlay is unique.

17. The method of claim 16, wherein the selected superimposing pattern comprises covering at least one of the challenge target locations multiple times.

18. The method of claim 6,
wherein the challenge key associated with the challenge verification image is established by the user; and
further comprising:

receiving, using a processor and the communication module, a request from a user to set up an image-based password for the challenge verification image for user authentication on the computer system;

in response to receiving the request to set up the image-based password, accessing the user information pertaining to the user by a set-up module;

the user selecting the challenge verification image with the user interface;

with the communications module and an action capture module, allowing the user to create the challenge key to be associated with the challenge verification image and to submit the key definition for the challenge key through the user interface, wherein the challenge verification image is selected by the user, wherein the set of challenge target locations for the challenge key is chosen by the user, and wherein the set of challenge actions for the challenge key is chosen by the user;

in response to receipt of the key definition, with the set-up module, associating the key definition with the selected challenge verification image to form a new verification image/key definition combination; and with a storage module, storing information related to the new verification image/key definition combination with the user information on the server.

19. The method of claim 18, wherein the user selecting the challenge verification image further comprises performing at least one of the following activities:

with the presentation module and the communications module, displaying verification image candidates to the user interface for review and selection as the challenge verification image by the user, with the communications module, allowing the user to submit a new challenge verification image through the user interface, and with the presentation module and the communications module, displaying one of the user's previous challenge verification images, comprising one of the challenge verification images already associated with the user information stored on the server, in order to allow the user to establish a new key definition to be associated with the one of the user's previous challenge verification image.

20. A method for establishing image-based passwords for computer-based user authentication, comprising:

receiving, using a processor and a communication module, a request from a user to set up an image-based password for user authentication on a computer system;

in response to receiving the request to set up an image-based password, accessing user information pertaining to the user by a set-up module,
  wherein the user information comprises information related to a plurality of verification image/key definition combinations associated with the user,
  wherein the plurality of verification image/key definition combinations are concurrently available to the processor for use in confirming user access rights to the application, and
  wherein the user information is accessed from a user information module on a server;

with at least one of a user interface, the communications module, and an action capture module, allowing the user to create a key to be associated with a verification image, and to submit a key definition for the key through the user interface,
  wherein the key comprises a set of actions to be performed on a display of the verification image at a set of target locations on the verification image, with the set of target locations comprising a portion of locations on the verification image, and
  wherein the key definition comprises an identification of the set of actions and the set of target locations that make up the key;

in response to receipt of the key definition, with the set-up module, associating the key definition with the verification image to form a new verification image/key definition combination; and with a storage module, storing information related to the new verification image/key definition combination with the user information on the server.

21. The method of claim 20, wherein the user selects the verification image, and further comprising at least one of the following activities:

with the presentation module and the communications module, displaying verification image candidates to the user interface for review and selection as the verification image by the user, with the communications module, allowing the user to submit a new verification image through the user interface, and with the presentation module and the communications module, displaying one of the user's previous verification images, comprising one of the verification images already associated with the user information stored on the server, in order to allow the user to establish a new key definition to be associated with the one of the user's previous verification image.

22. A computer program embodied on a non-transitory computer readable medium for computer-based user authentication, wherein the computer program comprises modules encoding interrelated and interdependent processes, including a communication module, a verification module, a presentation module, and an access module; and wherein the computer program is configured to perform a method comprising:

receiving, using a processor and the communication module, a request from a user to access an application on a computer system;

in response to receiving the request to access the application, accessing user information pertaining to the user by the verification module,
  wherein the user information is accessed from a user information module on a server,
  wherein the user information comprises information related to a plurality of verification image/key definition combinations that are associated with the user and that are concurrently available to the processor to use in confirming user access rights to the application,
  wherein a challenge verification image/key definition combination among the plurality of verification image/key definition combinations has associated therewith:
    a challenge verification image with a set of challenge target locations comprising a portion of locations on the challenge verification image,
    a challenge key comprising a set of challenge actions to be performed on a display of the challenge verification image at the challenge target locations on the challenge verification image by a user using the user interface, and
    a key definition comprising an identification of the set of challenge actions and the set of challenge target locations that make up the challenge key;

with the presentation module, selecting a login verification image from among the challenge verification images in the plurality of verification image/key definition combinations;

with the presentation module, presenting a display of the selected login verification image to a user interface for review by the user;

the user inputting an access key comprising login actions performed by the user on the display of the selected login verification image at login locations on the selected login verification image with the user interface;

the user interface submitting the inputted access key by communicating via the communication module with the verification module;

verifying the inputted access key with the verification module by comparing the inputted access key with the challenge key defined in a key definition associated with the selected login verification image,
  wherein the comparing comprises determining an identity between the login actions and the challenge actions and between the login locations and the challenge target locations; and in response to the verification module, verifying the inputted access key,
  generating with the access module an authorization that allows the user to access the application, and providing the user access to the application.

23. The computer program of claim 22,
further comprising a set-up module and an action capture module;
wherein the challenge key associated with the challenge verification image is established by the user; and
wherein the method further comprises:
  receiving, using a processor and the communication module, a request from a user to set up an image-based password for the challenge verification image for user authentication on the computer system;
  in response to receiving the request to set up the image-based password, accessing the user information pertaining to the user by a set-up module;
  the user selecting the challenge verification image with the user interface;
  with the communications module and an action capture module, allowing the user to create the challenge key to be associated with the challenge verification image and to submit the key definition for the challenge key through the user interface,
    wherein the challenge verification image is selected by the user,
    wherein the set of challenge target locations for the challenge key is chosen by the user, and
    wherein the set of challenge actions for the challenge key is chosen by the user;
  in response to receipt of the key definition, with the set-up module, associating the key definition with the selected challenge verification image to form a new verification image/key definition combination; and
  with a storage module, storing information related to the new verification image/key definition combination with the user information on the server.

24. A computer program embodied on a non-transitory computer readable medium for establishing image-based passwords for computer-based user authentication,
  wherein the computer program comprises modules encoding interrelated and interdependent processes, including a communication module, a set-up module, a presentation module, an action capture module, an associating module, and a storage module; and
  wherein the computer program is configured to perform a method comprising:
    receiving, using a processor and a communication module, a request from a user to set up an image-based password for user authentication on a computer system;
    in response to receiving the request to set up an image-based password, accessing user information pertaining to the user by a set-up module,
      wherein the user information comprises information related to a plurality of verification image/key definition combinations associated with the user,
      wherein the plurality of verification image/key definition combinations are concurrently available to the processor for use in confirming user access rights to the application, and
      wherein the user information is accessed from a user information module on a server;
    with at least one of a user interface, the communications module, and an action capture module, allowing the user to create a key to be associated with a verification image, and to submit a key definition for the key through the user interface,
      wherein the key comprises a set of actions to be performed on a display of the verification image at a set of target locations on the verification image, with the set of target locations comprising a portion of locations on the challenge verification image, and
      wherein the key definition comprises an identification of the set of actions and the set of target locations that make up the key;
    in response to receipt of the key definition, with the set-up module, associating the key definition with the verification image to form a new verification image/key definition combination; and
    with the storage module, storing information related to the new verification image/key definition combination with the user information on the server.

* * * * *